United States Patent
Shimazu et al.

(10) Patent No.: US 6,232,385 B1
(45) Date of Patent: May 15, 2001

(54) RESIN PARTS FOR MECHANICAL TRANSMISSION

(75) Inventors: Eiichiro Shimazu; Mari Kataoka; Masaki Egami, all of Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/538,533

(22) Filed: Mar. 30, 2000

(30) Foreign Application Priority Data

Mar. 30, 1999 (JP) .................................................. 11-088972

(51) Int. Cl.$^7$ ................................ C08K 3/00; C08K 3/40
(52) U.S. Cl. ............................................ 524/424; 524/494
(58) Field of Search ...................................... 524/424, 494

(56) References Cited

U.S. PATENT DOCUMENTS

| | | | | |
|---|---|---|---|---|
| 4,384,071 | * | 5/1983 | Nimry et al. ........................ | 524/600 |
| 5,132,394 | * | 7/1992 | Bockrath et al. ..................... | 528/353 |
| 5,731,373 | * | 3/1998 | Hirose et al. ........................ | 524/447 |

\* cited by examiner

*Primary Examiner*—Kriellion Sanders
(74) *Attorney, Agent, or Firm*—Wenderoth, Lind & Ponack L.L.P.

(57) ABSTRACT

A machine part is proposed which is made from TPI resin and is high in wear resistance and durability. The machine part is formed from a composition comprising 100 parts by weight of a thermoplastic polyimide resin, and 10–100 parts by weight of a reinforcing material, the thermoplastic polyimide resin having a crystallinity of 10% or over. The machine part may be a gear, a friction wheel or a cam used in a mechanical transmission. The crystallinity of the resin is adjusted to 10% or over by injection-molding the resin composition, and heating the thus injection-molded article at 220–340° C. for 5–24 hours.

6 Claims, No Drawings

RESIN PARTS FOR MECHANICAL TRANSMISSION

BACKGROUND OF THE INVENTION

The present invention relates to resin parts for use in a mechanical transmission such as gears, friction wheels and cams and a method for manufacturing the same.

There are two types of transmissions, namely, mechanical type and fluid type. The former has such parts as gears, friction wheels and cams to convert the rotary or reciprocating motion of a shaft, crank or rod to a different motion.

It is desired that such parts be small, lightweight, less expensive, need no grease and consume less energy. To meet these requirements, such parts are often made from resins.

Among resins used for this purpose, resin materials known as super-engineering plastics, which are characterized by their high heat resistance, are especially desirable if the parts are used at high temperatures over 150° C. There are two types of super-engineering plastics, i.e. thermosetting type and thermoplastic type. The former type includes polyimide (PI for short) resin and phenolic (PF) resin. The latter type includes polyarylether ketone (PAEK) resin, thermoplastic polyimide (TPI) resin, and polyamideimide (PAI) resin.

Among such super-engineering plastics, thermoplastic resins are more suitable in mechanical strength at low temperature and injection moldability for mass-production. As the main material for resin parts for mechanical transmissions, TPI resin, which has a glass transition point (Tg) of about 250° C. and a heat resistance of 200° C. or over, is particularly desirable because of its high mechanical strength in a wide temperature range and good injection moldability and mass-productivity.

But machine parts made by injection molding TPI resin have some drawbacks. One is that its crystallinity is as low as 4% or under. Low crystallinity means low wear resistance. Thus, such machine parts are not durable enough and poor in dimensional stability at high temperatures for use in mechanical transmissions.

When two of such TPI resin parts are brought into rolling, sliding or any other type of frictional contact with each other in a mechanical transmission, low wear resistance results from high cohesiveness. Thus, they tend to wear much more quickly than when a TPI resin part and a metal part are brought into frictional contact with each other under the same conditions.

An object of the invention is to provide machine parts which are made from TPI resin and can be used in a wide temperature range from lower than normal temperature to high temperature over 200° C. and are still high in wear resistance and durability.

Another object of the invention is to provide machine parts that show high cohesive wear resistance and durability when they are brought into rolling, sliding or any other type of frictional contact with each other in a mechanical transmission.

SUMMARY OF THE INVENTION

According to the invention, there is provided a resin part for use in a mechanical transmission, said resin part being formed from a resin composition comprising 100 parts by weight of thermoplastic polyimide resin, and 10–100 parts by weight of a reinforcing material, said thermoplastic polyimide resin having a crystallinity of 10% or over.

As the reinforcing material, fibrous material such as carbon fiber or glass fiber or whisker is preferable. The part may be a gear, friction wheel or cam.

From another aspect of the invention, there is provided a method of manufacturing a resin part comprising injection-molding a resin composition comprising 100 parts by weight of thermoplastic polyimide resin and 10–100 parts by weight of a reinforcing material, and heating the injection molding thus formed to adjust the crystallinity of the thermoplastic polyimide resin to 10% or over.

The heating is preferably conducted at a temperature of 220–340° C. for 5–24 hours.

The resin parts thus formed according to the present invention show high wear resistance and long life.

Crystallinity of the thermoplastic polyimide resin is reliably adjustable to 10% or over by the method according to the present invention.

Gears, friction wheels and cams thus formed show improved wear resistance and high durability (long life) even if used under high-load conditions such as under large torque.

DETAILED DESCRIPTION OF THE PREFERRED EMBODIMENT

The thermoplastic polyimide resin used in this invention may be a polymer having repeating units shown in Formula 1 or 3. An additional resin may be mixed into the thermoplastic polyimide resin in such an amount that the target crystallinity of the polyimide resin is achievable.

Formula 1

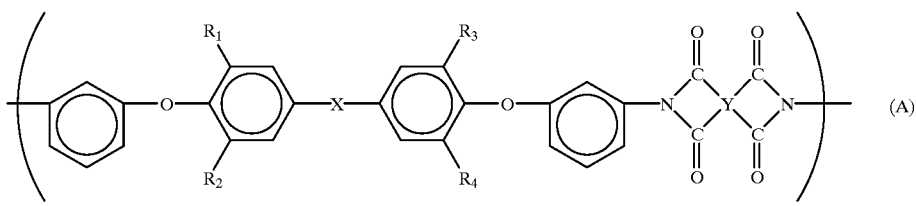

(A)

(In the formula 1, X denotes direct coupling, $-SO_2-$, $-CO-$, $-C(CH_3)_2-$, $-C(CF_3)_2-$ or $-S-$. $R_1$, $R_2$, $R_3$ and $R_4$ is hydrogen, alkyl group, alkoxy group, halogenated alkyl group, halogenated alkoxy group or halogen group. Y is one or more group selected from the group consisting of the following formula:

Formula 2

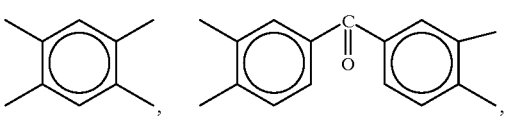

,

-continued

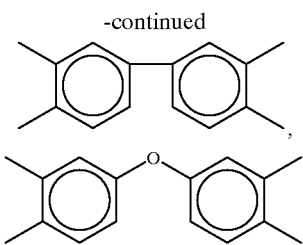

Formula 3

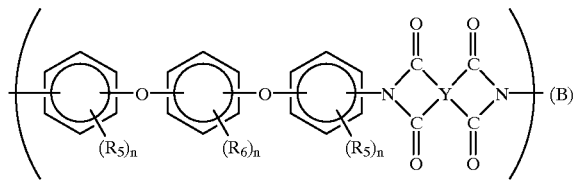

(In the formula 3, $R_5$ and $R_6$ are hydrogen, alkyl group, halogenated alkyl group, halogenated alkoxy group or halogen group. n is an integer (1, 2, 3 or 4). Y is as defined above in relation to formula 1.)

Formula 4

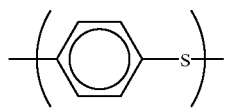

Formula 5

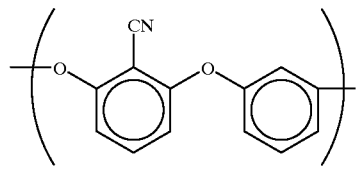

Formula 6

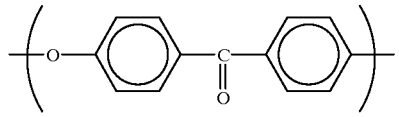

Formula 7

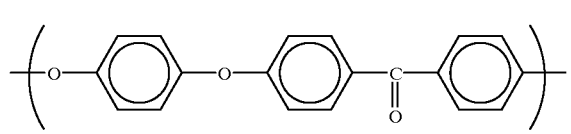

Formula 8

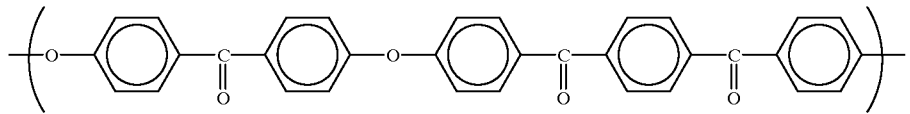

Formula 9

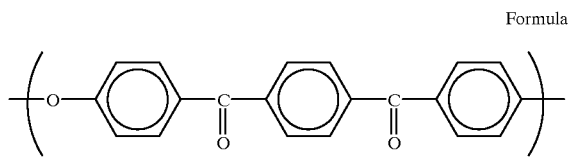

Such an additional resin may be a resin formed by a polymer having the following repeating units: polyphenylene sulfide (PPS) resin having a repeating unit shown in Formula 4 as polymer components; polyether nitride (PEN) resin having a repeating unit shown in Formula 5; polyaryletherketone (PAEK) resin having a repeating unit shown in Formulas 6–9. Among the PAEK resins, especially preferable ones are polyetherketone (PEK) resin having a repeating unit shown in Formula 6; polyetheretherketone (PEEK) resin having the repeating unit shown in Formula 7; and polyetherketoneetherketone (PEKEKK) resin having the repeating unit shown in formula 8.

The reinforcing material used in the present invention may be carbon fiber, glass fiber, whisker or any other fibrous filling material, or flaky or powdery inorganic reinforcing material, or their mixture.

Specific fibrous reinforcing materials usable in this invention are carbon fibers such as PAN carbon fibers and pitch carbon fibers, milled fiber, glass fiber, potassium titanate fiber, boron fiber, silicon carbide fiber, metallic fibers formed of copper, aluminum or zinc fiber, other inorganic fibers, organic fibers such as aromatic polyamide fibers, and whiskers.

Specific whiskers include silicon carbide whisker, silicon nitride whisker, potassium titanate whisker, aluminum borate whisker, zinc oxide whisker, magnesium sulphate whisker, magnesia whisker, magnesium borate whisker, titanium diborate whisker, calcium carbonate whisker, graphite whisker, bismuth whiskers, magnesium oxide whisker, aluminum nitride whisker and ceramics whiskers such as mullite and magnesium pyroborate.

Specific inorganics include glass beads, wollastonite, talc, kaolin, silicon dioxide, clay, asbestos, calcium carbonate, magnesium hydroxide, silica, diatomaceous earth, carborundum in powdery or granular form, and flakes such as mica, aluminum foil and zinc foil.

The reinforcing material is treated with an epoxy or amino group silane coupling agent to improve affinity with the resin and its dispersibility.

Among these reinforcing materials, carbon fiber, glass fiber and whisker are especially preferable.

The reinforcing material should be added at the rate of 10–100 parts by weight, preferably 20–70 parts by weight to 100 parts by weight of the resin. If the rate is lower than this range, the resin parts formed tend to be deformed or broken during use in a mechanical transmission due to insufficient mechanical strength. If the rate is higher than the above range, flowability of resin during molding tends to be very poor and also the molded parts formed tend to be brittle due to shortage of the resin content, resulting in deformation or breakage. Also, depending upon the kind of reinforcing material, the mating resin member in the transmission may be worn severely.

Provided that the effect of the invention is not unduly affected, various additives may be incorporated into the thermoplastic polyimide resin, the main component. Such additives include solid lubricants such as polytetrafluoroethylene, graphite and molybdenum disulfide, antioxidants, heat stabilizers, ultraviolet absorbers, flame-retardants, antistats, conductivity imparting agents, nucleating agent, and crystallinity promoters.

In order to injection mold a TPI resin composition to which is added such a reinforcing material as mentioned above, the composition is dry-mixed in a mixer such as a Henschel mixer, a ball mill or a tumbler mixer, and either injection-molded by means of an injection molder having a good melt miscibility, or melt-mixed by a melt extruder such as a twin-screw extruder and then injection-molded. Otherwise the composition may be melt-mixed by use of a hot roller, kneeder, Bunbery mixer or a melt-extruder, and then injection-molded.

EXAMPLES AND COMPARATIVE EXAMPLES

Materials used for Examples of the invention and Comparative Examples are listed below. Their abbreviations are in bracket. Their contents in the composition are shown in Table 1 in weight part.
(1) Thermoplastic polyimide resin (AURUM #450 made by Mitsui Chemical Co., Ltd.)[TPI-1]
(2) Thermoplastic polyimide resin (resin in the form of pallets formed by mixing 100 parts by weight of TPI resin represented by Formula 1 and made by Mitsui Chemical Co., Ltd., 40 parts by weight of PEK, 20 parts by weight of carbon black and 20 parts by weight of bis-imide compound, and melt-mixing at 410° C.)[TPI-2]
(3) Polyetherketone resin (PEK made by VICTREX)[PEK]
(4) Polyetheretherketone resin (PEEK150P made by Mitsui Chemical Co., Ltd.)
(5) Polyacetal resin (DURACON NW-2 made by Polyplastics) [POM]
(6) Polyamide resin (A1030CN made by UNITICA)[PA]
(7) carbon fiber (HM35-C65 made by Toho Rayon)[CF]
(8) glass fiber (ECS03T747 made by Nippon Electric Glass) [GF]

Examples 1–7 and Comparative Examples 1–5

Raw materials were mixed together at the rates shown in Table 1 and the mix was melt-kneaded in a twin-screw extruder while adding a reinforcing material to form pellets. The pellets were then molded into involute gears having a pitch circle diameter of 30 mm, module of 1, and a tooth width of 5 mm by injection molding under molding conditions (nozzle temperature, mold temperature, cooling time) shown in Table 1.

In Examples 3, 4, 5, 7 and Comparative Example 3, the gears are formed by heat-treating the injection molded blanks and lathing. In the other Examples, the gears were formed directly by injection molding. The heat treatment in Examples 3, 4, 5 and 7 consisted of a first 3-hour heating at 180° C., a second 3-hour heating at 240° C., a third 8-hour heating at 260° C., a final 2-hour heating at 320° C., and a gradual cooling. The heat treatment in Comparative Example 3 consists of 8-hour heating at 200° C. and gradual cooling.

Crystallinity (%) of the gears thus formed were determined and listed in Table 1.

<Crystallinity>

Each of the specimen gears was heated in nitrogen atmosphere from room temperature to 420° C. at a rate of 10° C. per minute. By means of a differential thermal calorimeter (DSC), the fusion energy ΔHm and the crystallization energy were determined. By utilizing the difference between two energies and calculation assuming the additive property of enthalpy of crystal and non-crystal, the crystallinities of the specimen gears were determined. The fusion energy ΔHm of hypothetical TPL and PEEK resins have the crystallinity of 100% was assumed to be 28 cal/gram and 29 cal/gram, respectively.

The gears formed according to the respective Examples 1–7 and Comparative Examples 1–5 were subjected to endurance tests a) and b) under the conditions 1–3 shown below. In the test a), the amount of wear (mg) of each gear was measured after it had been rotated $10^7$ times in mesh with a mating gear identical in shape and size to the gears tested and made from S45C (carbon steel). In the test b), the life cycle (value in the table×$10^6$) of each gear was measured after it had been rotated $10^7$ times in mesh with a mating gear identical in shape, size and material to the gear tested. The test results are shown in Table 2.

Condition 1: torque 3.5 kgf.cm, revolving speed: 637 rpm, room temperature

Condition 2: torque 11.5 kgf.cm, revolving speed: 637 rpm, room temperature

Conditions 3: torque 11.5 kgf.cm, revolving speed: 637 rpm, 230° C.

As is apparent from Table 2, Comparative Example 1, of which the crytallinity is less than 10%, showed high amount of wear when rotated in mesh with a gear made of the same material, though it showed passable wear resistance when brought into mesh with a metal (S45C) gear. Under large-torque conditions (condition 2) and under high-temperature, large-torque conditions (conditions 3), the gears according to Comparative Example 1 showed inferior wear resistance and durability.

For Comparative Example 2, of which the carbon fiber content was too low, though the crystallinity was 24%, and Comparative Example 3, in which polyetheretherketone resin was used instead of thermoplastic polyimide resin, the amount of wear was large and the durability was inferior under high-torque conditions 2 and 3.

The gears according to Comparative Examples 4 and 5, which were made of amorphous resin, were broken, deformed or worn severely under conditions 2 and 3 in which torque was high, so that the test had to be discontinued.

Compared to Comparative Examples, the gears according to any of Examples 1–7, which satisfy all the requirements, were low in wear resistance and far higher in the number of cycles in the endurance test than Comparative Examples either when they are brought into mesh with a mating gear made from the same material or with a metal (S45C) gear in a wide temperature range from room temperature to 200° C. or over.

When the gears according to the Examples were used in combination with a metallic mating gear, the amount of wear of the mating gear was not more than 1 mg irrespective of the environmental temperature during the test. Thus, it has been found that the gears according to the invention have low attack to the mating gear.

As described above, the present invention provides parts made of TPI resin for mechanical transmissions which can be used in a wide temperature range from low temperature to high temperature over 200° C., and have good wear resistance and high durability.

Another advantage of the resin parts according to the present invention is that even when they roll or slide in frictional contact with the parts of the same material, the parts will not aggregate together. They can form a mechanical transmission which has low wear and long working life.

TABLE 1

| | EXAMPLE | | | | | | | COMPARATIVE EXAMPLE | | | | |
|---|---|---|---|---|---|---|---|---|---|---|---|---|
| | 1 | 2 | 3 | 4 | 5 | 6 | 7 | 1 | 2 | 3 | 4 | 5 |
| (1) TPI-1 | — | — | 100 | 100 | 100 | — | 100 | 100 | — | — | — | — |
| (2) TPI-2 | 100 | 100 | — | — | — | 100 | — | — | 100 | — | — | — |
| (3) PEK | — | — | — | 35 | — | — | — | — | — | — | — | — |
| (4) PEEK | — | — | — | — | 20 | — | — | — | — | 100 | — | — |
| (5) POM | — | — | — | — | — | — | — | — | — | — | 100 | — |
| (6) PA | — | — | — | — | — | — | — | — | — | — | — | 100 |
| (7) CF | 15 | 30 | 45 | 60 | — | — | — | 30 | 5 | 45 | — | 45 |
| (8) GF | — | — | — | — | 30 | 45 | 65 | — | — | — | — | — |
| Induction Molding | | | | | | | | | | | | |
| Nozzle temp. (° C.) | 410 | 410 | 410 | 410 | 410 | 410 | 410 | 410 | 410 | 390 | 190 | 245 |
| Mold temp. (° C.) | 230 | 200 | 200 | 200 | 200 | 230 | 200 | 200 | 230 | 180 | 80 | 60 |
| Cooling time (sec) | 50 | 25 | 25 | 25 | 25 | 50 | 25 | 25 | 50 | 20 | 20 | 20 |
| Heat treated? | No | No | Yes | Yes | Yes | No | Yes | No | No | Yes | No | No |
| Cristallinity (%) | 22 | 12 | 32 | 32 | 33 | 26 | 33 | 4 | 24 | 35 | ※ | ※ |

※ denotes that crystallinity was not determined.

TABLE 2

| | | EXAMPLE | | | | | | | COMPARATIVE EXAMPLE | | | | |
|---|---|---|---|---|---|---|---|---|---|---|---|---|---|
| | | 1 | 2 | 3 | 4 | 5 | 6 | 7 | 1 | 2 | 3 | 4 | 5 |
| 1 | Test(a) mg | 2.3 | 4.2 | 1.7 | 1.6 | 4.3 | 4.3 | 4.0 | 4.5 | 4.4 | 2.9 | 5.2 | 4.9 |
| | Test(b) × $10^6$ | >10 | >10 | >10 | >10 | >10 | >10 | >10 | 4.8 | >10 | >10 | >10 | >10 |
| 2 | Test(a) mg | 7.8 | 7.6 | 6.5 | 5.1 | 12.1 | 11.3 | 9.8 | 24.5 | 48.2 | 15.2 | x | x |
| | Test(b) × $10^6$ | >10 | 8.6 | >10 | >10 | 7.4 | 9.2 | >10 | 1.6 | x | 5.1 | x | x |
| 3 | Test(a) mg | 32.1 | 36.8 | 26.8 | 25.2 | 47.5 | 44.2 | 41.9 | 200.5 | 120.8 | 156.3 | x | x |
| | Test(b) × $10^6$ | 8.9 | 7.8 | >10 | >10 | >10 | 8.2 | 9.4 | x | x | 1.7 | x | x | x in the table denotes that breakage, deformation or wear made it impossible to continue the test.

What is claimed is:

1. A resin part for use in a mechanical transmission, said resin part being formed from a composition comprising 100 parts by weight of a thermoplastic polyimide resin, and 10–100 parts by weight of a reinforcing material, said thermoplastic polyimide resin having a crystallinity of not less than 10%.

2. The part as claimed in claim 1 wherein said reinforcing material is carbon fiber or glass fiber or whisker.

3. The part as claimed in claim 1 wherein said part is a gear, a friction wheel or a cam.

4. A method of manufacturing a resin part for use in a mechanical transmission, said method comprising injection molding a resin composition comprising 100 parts by weight of a thermoplastic polyimide resin, and 10–100 parts by weight of a reinforcing material, and heating the thus injection-molded article to adjust the crystallinity of said thermoplastic polyimide resin to 10% or over.

5. The method as claimed in claim 4 wherein the heating is conducted at 220–340° C. for 5–24 hours.

6. The part as claimed in claim 2 wherein said part is a gear, a friction wheel or a cam.

* * * * *